United States Patent
Tang et al.

(10) Patent No.: US 10,586,082 B1
(45) Date of Patent: Mar. 10, 2020

(54) ADVANCED MICRO-LOCATION OF RFID TAGS IN SPATIAL ENVIRONMENTS

(71) Applicant: Fellow, Inc., Burlingame, CA (US)

(72) Inventors: Xinyi Daniel Tang, Burlingame, CA (US); Utkarsh Sinha, Burlingame, CA (US); Daniel Thomas Barry, Burlingame, CA (US); Jagadish Mahendran, Burlingame, CA (US); Marco Octavio Mascorro Medina, Burlingame, CA (US)

(73) Assignee: FELLOW, INC., Burlingame, CA (US)

( * ) Notice: Subject to any disclaimer, the term of this patent is extended or adjusted under 35 U.S.C. 154(b) by 0 days.

(21) Appl. No.: 16/543,395

(22) Filed: Aug. 16, 2019

Related U.S. Application Data

(60) Provisional application No. 62/854,094, filed on May 29, 2019.

(51) Int. Cl.
*G08B 13/14* (2006.01)
*G06K 7/10* (2006.01)
(Continued)

(52) U.S. Cl.
CPC ........ *G06K 7/10099* (2013.01); *G01S 13/505* (2013.01); *G01S 17/89* (2013.01);
(Continued)

(58) Field of Classification Search
CPC ... G01S 13/756; G06K 7/10316; G06K 7/008
(Continued)

(56) References Cited

U.S. PATENT DOCUMENTS

| | | | |
|---|---|---|---|
| 4,354,252 A | 10/1982 | Lamb et al. | 340/502 |
| 4,638,445 A | 1/1987 | Mattaboni | 701/23 |

(Continued)

FOREIGN PATENT DOCUMENTS

| | | | |
|---|---|---|---|
| CN | 102750274 | 10/2012 | G06F 17/30 |
| CN | 103459099 | 12/2013 | B25J 13/08 |

(Continued)

OTHER PUBLICATIONS

U.S. Appl. No. 13/586,732, filed Aug. 15, 2012.
(Continued)

*Primary Examiner* — Tai T Nguyen
(74) *Attorney, Agent, or Firm* — Hayes Soloway P.C.

(57) ABSTRACT

Advanced micro-location of RFID tags in 3D and 2D spatial environments includes a mobile platform having a known location within a three-dimensional (3D) space. A plurality of RFID tags is located within the 3D space. A plurality of RFID antennas is mounted on the mobile platform, wherein backscatter signals of at least one of the RFID tags are collected by at least one of the plurality of RFID antennas and time-synchronized with the known location of the mobile platform in the 3D space at a time of collection. A computerized processing device is in communication with the plurality of RFID antennas. The computerized processing device performs algorithmic RFID tag localization using at least the collected backscatter signals of the at least one RFID tag and the time-synchronized known location of the mobile platform to determine a micro-location of the at least one RFID tag within the 3D space.

26 Claims, 12 Drawing Sheets

(51) Int. Cl.
*G01S 13/50* (2006.01)
*H04B 17/318* (2015.01)
*G06N 20/00* (2019.01)
*G01S 17/89* (2020.01)

(52) U.S. Cl.
CPC ......... *G06K 7/10356* (2013.01); *G06N 20/00* (2019.01); *H04B 17/318* (2015.01)

(58) Field of Classification Search
USPC ... 340/572.4, 572.7, 505, 10.31, 10.5, 10.41
See application file for complete search history.

(56) References Cited

U.S. PATENT DOCUMENTS

| | | | |
|---|---|---|---|
| 4,890,241 A | 12/1989 | Hoffman et al. | 700/255 |
| 4,939,728 A | 7/1990 | Markkula et al. | 370/419 |
| 5,293,639 A | 3/1994 | Wilson et al. | 455/17 |
| 5,952,922 A * | 9/1999 | Shober | G01S 13/756 340/572.4 |
| 6,177,861 B1 * | 1/2001 | MacLellan | G06K 7/0008 340/10.1 |
| 6,292,713 B1 | 9/2001 | Jouppi et al. | 700/245 |
| 6,347,261 B1 | 2/2002 | Sakaue et al. | 700/245 |
| 6,401,076 B1 | 6/2002 | Hall | G06Q 10/087 |
| 7,151,979 B2 | 12/2006 | Andersen | B65H 18/28 |
| 7,461,156 B2 | 12/2008 | Haupt et al. | 709/228 |
| 7,609,686 B1 | 10/2009 | McNamara et al. | 370/356 |
| 7,693,757 B2 | 4/2010 | Zimmerman | G06Q 10/00 |
| 7,702,739 B1 | 4/2010 | Cheng et al. | 709/207 |
| 7,801,959 B1 | 9/2010 | Lennie et al. | 709/206 |
| 7,827,459 B1 | 11/2010 | Zhou et al. | 714/749 |
| 8,046,744 B1 | 10/2011 | Marshall et al. | 717/128 |
| 8,050,684 B2 | 11/2011 | Lewis et al. | 455/445 |
| 8,407,306 B1 | 3/2013 | Nerieri et al. | 709/206 |
| 8,594,845 B1 | 11/2013 | Gharpure | 700/253 |
| 8,619,799 B1 | 12/2013 | Thodupunoori et al. | 370/401 |
| 8,700,722 B1 | 4/2014 | Sharma et al. | 709/206 |
| 8,965,762 B2 | 2/2015 | Song et al. | 704/236 |
| 9,191,619 B2 | 11/2015 | Liu | H04N 7/157 |
| 9,205,886 B1 | 12/2015 | Hickman et al. | B62D 57/032 |
| 9,436,857 B2 | 9/2016 | Wang | G06K 19/07773 |
| 9,469,030 B2 | 10/2016 | Wang et al. | B25J 9/1664 |
| 9,767,432 B1 | 9/2017 | Brazeau et al. | G06Q 10/087 |
| 10,318,917 B1 | 6/2019 | Goldstein | G06Q 10/087 |
| 10,373,116 B2 | 8/2019 | Medina et al. | G06Q 10/087 |
| 2002/0071427 A1 | 6/2002 | Schneider et al. | 370/352 |
| 2002/0160805 A1 | 10/2002 | Laitinen et al. | 455/550 |
| 2002/0165790 A1 | 11/2002 | Bancroft et al. | 705/26 |
| 2003/0174099 A1 | 9/2003 | Bauer | G06K 7/0008 |
| 2004/0164696 A1 | 8/2004 | Yourlo et al. | 318/568.11 |
| 2005/0030176 A1 * | 2/2005 | Wagner | G07C 9/00111 340/539.13 |
| 2005/0131578 A1 | 6/2005 | Weaver | G01G 19/4144 |
| 2006/0047665 A1 | 3/2006 | Neil | 707/10 |
| 2006/0071774 A1 | 4/2006 | Brown et al. | 340/522 |
| 2006/0071929 A1 | 4/2006 | Stinis et al. | 345/213 |
| 2006/0105792 A1 | 5/2006 | Armbruster et al. | 455/517 |
| 2006/0106471 A1 | 5/2006 | Ikeda et al. | 700/83 |
| 2006/0178559 A1 | 8/2006 | Kumar et al. | 600/109 |
| 2006/0190526 A1 | 8/2006 | Neil et al. | 709/203 |
| 2006/0258287 A1 | 11/2006 | Bidet et al. | 455/41.2 |
| 2007/0069014 A1 | 3/2007 | Heckel et al. | 235/383 |
| 2007/0100951 A1 | 5/2007 | Bae | 709/206 |
| 2007/0123307 A1 | 5/2007 | Adams et al. | 455/566 |
| 2007/0130255 A1 | 6/2007 | Wolovitz et al. | 709/204 |
| 2007/0156817 A1 | 7/2007 | Daffner et al. | 709/206 |
| 2007/0162582 A1 | 7/2007 | Belali et al. | 709/223 |
| 2007/0299918 A1 | 12/2007 | Roberts | 709/206 |
| 2008/0039974 A1 | 2/2008 | Sandin | G05D 1/0225 |
| 2008/0077511 A1 | 3/2008 | Zimmerman | 705/28 |
| 2008/0080370 A1 | 4/2008 | Willey | 370/229 |
| 2008/0109519 A1 | 5/2008 | Aaltonen et al. | 709/206 |
| 2008/0140789 A1 | 6/2008 | Mulligan et al. | 709/206 |
| 2008/0244040 A1 | 10/2008 | Bhatia et al. | 709/219 |
| 2008/0305775 A1 | 12/2008 | Aaltonen et al. | 455/412.1 |
| 2009/0009295 A1 | 1/2009 | Rofougaran | 340/10.1 |
| 2009/0047929 A1 | 2/2009 | Chesnutt et al. | 455/411 |
| 2009/0055019 A1 | 2/2009 | Stiehl | B25J 9/1671 |
| 2009/0094140 A1 | 4/2009 | Kwan | G06Q 10/087 |
| 2009/0149992 A1 | 6/2009 | Ohno | 700/253 |
| 2009/0163244 A1 | 6/2009 | Parkkinen et al. | 455/558 |
| 2009/0209250 A1 | 8/2009 | Huq | 455/425 |
| 2009/0281880 A1 | 11/2009 | Lee | 705/11 |
| 2010/0005044 A1 | 1/2010 | Bowring et al. | 706/20 |
| 2010/0070588 A1 | 3/2010 | Sinn et al. | 709/206 |
| 2010/0094461 A1 | 4/2010 | Roth et al. | 700/251 |
| 2010/0094985 A1 | 4/2010 | Abu-Samaha et al. | 709/223 |
| 2010/0131103 A1 | 5/2010 | Herzog et al. | 700/259 |
| 2010/0150171 A1 | 6/2010 | Rodbro et al. | 370/468 |
| 2010/0238262 A1 | 9/2010 | Kurtz | H04N 7/142 |
| 2010/0245532 A1 | 9/2010 | Kurtz | G06K 9/00711 |
| 2010/0314226 A1 | 12/2010 | Patel et al. | 200/237 |
| 2011/0054731 A1 * | 3/2011 | DeRose | G06Q 10/08 701/31.4 |
| 2011/0071676 A1 | 3/2011 | Sanders et al. | 700/250 |
| 2011/0087571 A1 | 4/2011 | Sagi et al. | 705/34 |
| 2011/0125856 A1 | 5/2011 | Chu et al. | 709/206 |
| 2011/0158476 A1 | 6/2011 | Fahn et al. | 382/103 |
| 2011/0173621 A1 | 7/2011 | Meijer et al. | 718/102 |
| 2011/0213657 A1 | 9/2011 | O'Malley et al. | 705/14.49 |
| 2011/0225578 A1 | 9/2011 | Lauwers et al. | 717/176 |
| 2011/0231050 A1 | 9/2011 | Goulding | 701/26 |
| 2011/0238211 A1 | 9/2011 | Shirado et al. | 700/246 |
| 2011/0288684 A1 | 11/2011 | Farlow et al. | 700/264 |
| 2011/0307403 A1 | 12/2011 | Rostampour et al. | 705/325 |
| 2012/0033605 A1 | 2/2012 | Yang et al. | 370/312 |
| 2012/0042028 A1 | 2/2012 | Langoulant et al. | 709/206 |
| 2012/0069131 A1 | 3/2012 | Abelow | 348/14.01 |
| 2012/0122425 A1 | 5/2012 | Adams et al. | 455/412.1 |
| 2012/0185547 A1 | 7/2012 | Hugg et al. | 709/206 |
| 2012/0239196 A1 | 9/2012 | Olivier | B25J 9/1689 |
| 2012/0284397 A1 | 11/2012 | Cheng | 709/224 |
| 2012/0303774 A1 | 11/2012 | Wilson et al. | 709/223 |
| 2012/0311046 A1 | 12/2012 | Grigoriev | 709/206 |
| 2012/0315879 A1 | 12/2012 | Vrbaski et al. | 455/412.1 |
| 2013/0007299 A1 | 1/2013 | German et al. | 709/237 |
| 2013/0047034 A1 | 2/2013 | Salomon et al. | 714/18 |
| 2013/0050743 A1 | 2/2013 | Steely et al. | 358/1.15 |
| 2013/0111572 A1 | 5/2013 | Gaddam et al. | 726/7 |
| 2013/0120547 A1 | 5/2013 | Linnell | 348/61 |
| 2013/0151007 A1 | 6/2013 | Valpola | B25J 9/1694 |
| 2013/0173727 A1 | 7/2013 | Libin et al. | 709/206 |
| 2013/0179514 A1 | 7/2013 | Arora et al. | 709/206 |
| 2013/0194077 A1 | 8/2013 | Vargas | G06K 7/10386 |
| 2013/0212203 A1 | 8/2013 | Park et al. | 709/206 |
| 2013/0231779 A1 | 9/2013 | Purkayastha et al. | 700/259 |
| 2014/0009561 A1 | 1/2014 | Sutherland et al. | 348/14.05 |
| 2014/0009612 A1 | 1/2014 | King | B66F 9/0755 |
| 2014/0095216 A1 | 4/2014 | Radhakrishnan | 705/5 |
| 2014/0184423 A1 | 7/2014 | Mensinger et al. | 340/870.09 |
| 2014/0270115 A1 | 9/2014 | Burnett et al. | 379/88.12 |
| 2014/0304238 A1 | 10/2014 | Halla-Aho et al. | 707/692 |
| 2014/0344118 A1 | 11/2014 | Parpia et al. | G06Q 10/087 |
| 2014/0361077 A1 | 12/2014 | Davidson | G06Q 10/08 |
| 2014/0361078 A1 | 12/2014 | Davidson | G06K 7/10356 |
| 2015/0052029 A1 | 2/2015 | Wu et al. | G06Q 10/087 |
| 2015/0246654 A1 | 9/2015 | Tadic | B60W 40/09 |
| 2015/0248536 A1 | 9/2015 | Tawil et al. | G06F 19/3418 |
| 2016/0114488 A1 | 4/2016 | Mascorro Medina et al. | B25J 9/1697 |
| 2016/0132707 A1 | 5/2016 | Lindbo et al. | G06K 7/1413 |
| 2016/0236867 A1 | 8/2016 | Brazeau | B65G 1/1378 |
| 2016/0247116 A1 | 8/2016 | Olivo et al. | G06Q 10/087 |
| 2016/0325934 A1 | 11/2016 | Stiernagle et al. | B65G 1/1373 |
| 2016/0371630 A1 | 12/2016 | Jetcheva | G06Q 10/087 |
| 2018/0164213 A1 | 6/2018 | Windorfer | G01N 21/251 |
| 2018/0370628 A1 | 12/2018 | Ljubuncic | B64C 39/024 |
| 2019/0235511 A1 | 8/2019 | Tiwari | G01B 21/18 |

FOREIGN PATENT DOCUMENTS

| | | | |
|---|---|---|---|
| CN | 104019809 | 9/2014 | G01C 21/00 |
| JP | H11328266 | 11/1999 | G06F 15/00 |

(56) References Cited

FOREIGN PATENT DOCUMENTS

| JP | 2003016351 | 1/2003 | ............ G01C 21/00 |
|---|---|---|---|
| JP | 2005172879 | 6/2005 | ............ B25J 13/00 |
| JP | 2006323708 | 11/2006 | ............ G06Q 30/02 |
| JP | 2007190641 | 8/2007 | ............ A63H 3/33 |
| JP | 2008055578 | 3/2008 | ............ A63H 3/33 |
| JP | 2011128790 | 6/2011 | ............ G06F 17/30 |
| WO | WO2013033442 | 3/2013 | ............ G06K 19/00 |

OTHER PUBLICATIONS

U.S. Appl. No. 13/896,162, filed May 16, 2013.
U.S. Appl. No. 14/921,899, filed Oct. 23, 2015.
U.S. Appl. No. 15/369,812, filed Dec. 5, 2017.
U.S. Appl. No. 15/791,269, filed Oct. 23, 2017.
U.S. Appl. No. 16/138,758, filed Sep. 1, 2018.
U.S. Appl. No. 16/457,647, filed Jun. 28, 2019.
U.S. Appl. No. 16/543,395, filed Aug. 16, 2019.
U.S. Appl. No. 16/546,150, filed Aug. 20, 2019.
Advisory Action issued in co-pending related U.S. Appl. No. 13/586,732, dated Dec. 23, 2015 (4 pages).
Broccia et al., "Gestural Interaction for Robert Motion Control," Eurographics Italian Conference, 2011, (8 pgs).
Campbell et al., "The Message Session Relay Protocol (MSRP)", RFC 4975, 2005 (64 pgs).
Campbell et al., "The Message Session Relay Protocol", (58 pgs).
European Search Report issued in application No. 15852996.6, dated Mar. 16, 2018 (7 pgs).
International Preliminary Report on Patentability issued in application No. PCT/US2015/057392, dated May 4, 2017 (8 pgs).
International Preliminary Report on Patentability issued in application No. PCT/US2017/064753, datedJun. 11, 2019 (8 pgs).
International Search Report and Written Opinion from related PCT International Patent Application Serial No. PCT/US2017/064753, dated Feb. 6, 2018 (10 pgs).
International Search Report and Written Opinion issued in application No. PCT/US15/657392, dated Jan. 12, 2016 (10 pgs).
International Search Report and Written Opinion issued in application No. PCT/US2018/052279, dated Jan. 22, 2019 (12 pgs).
Japanese Decision to Grant issued in application No. 2017-522057, dated Feb. 13, 2019 (10 pgs).
Japanese Office Action (w/translation) issued in application No. 2017-522057, dated Jun. 25, 2018 (9 pgs).
Libin et al., U.S. Appl. No. 61/580,907, Dec. 28, 2011 (4 pgs).
Lixia Zhang, *VirtualClock:A New Traffic Control Algorithm for Packet Switching Networks*, ACM SIGCOMM Computer Communication Review, 1990, pp. 19-29.
Notice of Allowance issued in U.S. Appl. No. 13/586,732, dated Dec. 8, 2016 (22 pgs).
Notice of Allowance issued in U.S. Appl. No. 13/896,162 , dated Jul. 31, 2015 (33 pgs).
Notice of Allowance issued in U.S. Appl. No. 14/921,899, dated Aug. 31, 2017 (14 pgs).
Notice of Allowance issued in U.S. Appl. No. 15/369,812, dated Apr. 19, 2019 (11 pgs).
Office Action issued in U.S. Appl. No. 13/586,732, dated Jun. 6, 2014 (24 pgs).
Office Action issued in U.S. Appl. No. 13/586,732, dated Mar. 20, 2015 (26 pgs).
Office Action issued in U.S. Appl. No. 13/586,732, dated Sep. 30, 2015 (23 pgs).
Office Action issued in U.S. Appl. No. 13/586,732, dated Sep. 2, 2016 (39 pgs).
Office Action issued in U.S. Appl. No. 13/896,162 , dated Jan. 22, 2015 (22 pgs).
Office Action issued in U.S. Appl. No. 14/921,899, dated Jun. 7, 2017 (43 pgs).
Office Action issued in U.S. Appl. No. 15/369,812, dated Aug. 7, 2018 (39 pgs).
Office Action issued in U.S. Appl. No. 15/369,812, dated Dec. 12, 2018 (18 pgs).
Office Action issued in U.S. Appl. No. 15/369,812, dated Mar. 20, 2019 (10 pgs).
Office Action issued in U.S. Appl. No. 15/791,269, dated Jul. 12, 2019 (51 pgs).
Office Action issued in U.S. Appl. No. 16/138,758, dated Jan. 18, 2019 (25 pgs).
Office Action issued in U.S. Appl. No. 16/457,647, dated Jul. 31, 2019 (30 pgs).
Official Action issued in co-pending related U.S. Appl. No. 13/586,732, dated Mar. 24, 2016 (32 pages).
Official Action issued in co-pending related U.S. Appl. No. 13/586,732, dated Oct. 24, 2014 (20 pages).
Yim et al., Design Considerations of Expressive Bidirectional Telepresence Robots, CHI 2011, May 7-12, 2011 (10 pgs).
Office Action issued in a U.S. Appl. No. 15/791,269, dated Oct. 2, 2019 (18 pgs).
Chinese Office Action (w/translation) issued in application No. 201580069534.2, dated Oct. 9, 2019 (24 pgs).
International Search Report and Written Opinion issued in application No. PCT/US19/52264, dated Dec. 13, 2019 (12 pgs).
Office Action issued in U.S. Appl. No. 16/457,647, dated Nov. 26, 2019 (29 pgs).
Office Action issued in U.S. No. 16/546,150, dated Nov. 21, 2019 (19 pgs).

* cited by examiner

ADVANCED MICRO-LOCATION OF RFID TAGS IN SPATIAL ENVIRONMENTS

CROSS REFERENCE TO RELATED APPLICATION

This application claims benefit of U.S. Provisional Application Ser. No. 62/854,094, entitled, "Obtain Advanced Micro-Location of RFID Tags in a 3D and 2D Spatial Environment" filed May 29, 2019, the entire disclosure of which is incorporated herein by reference.

FIELD OF THE DISCLOSURE

The present disclosure is generally related to RFID tag locating and more particularly is related to advance micro-location of RFID tags in spatial environments.

BACKGROUND OF THE DISCLOSURE

Inventory management in retail and commercial buildings is a complex, time-consuming, and expensive issue. Large stores can carry more than 10,000 items on shelves, and these items must be tagged, tracked, displayed, restocked, and priced on a regular basis to ensure product availability to customers.

Inventory stocking is the process of placing items out on shelves or in displays such that they can be purchased by customers. Restocking is the process of replenishing items that have been purchased, moved, stolen, or damaged. Stocking and restocking are time-consuming tasks, since they normally entail the detailed review of all products for sale. Traditionally, store employees travel each aisle, noting the number and location of depleted or missing items. They gather new inventory from a backroom storage area, then travel each aisle again, replenishing low stock with new inventory. Depending on the store, this process can take dozens of employees and many hours to complete. Often, restocking must be done after a store has closed or late at night. This can leave shelves understocked for long periods during business hours. Additionally, the process can require additional employees working an overnight shift to complete restocking before the opening of the store the next day.

While employees are restocking inventory on shelves, they often must concurrently perform quality assurance checks. Employees ensure that all items are properly located, returning moved and misplaced items to their appropriate areas. Often, this means traveling the entire store in search of misplaced items and subsequently placing the misplaced items in their correct locations. Additionally, employees must also ensure that items are displayed neatly, with price tags and labels visible. Employees also frequently need to make sure that any pricing information displayed is correct. Often, this means checking item prices against periodic or special sales lists and amending incorrect displays. Furthermore, this method of pricing is not dynamic, as it is difficult for retail stores to adjust prices quickly based on supply and demand.

Additionally, many franchise or branch stores are required to stock and display products in a manner determined by a corporate office. Such information is usually displayed in the form of a planogram: a diagram that indicates the placement of products on a shelf and in a store. Planogram compliance can be inaccurate for a number of reasons, including human error in reading the diagram, differences in store layout, inattention to placement details, and changes in product packaging. However, planogram compliance is important to ensure consistency between stores and to present products for sale according to a chosen strategic plan. If stores do not stock and display products accurately, the data upon which corporate offices analyze sales and create strategic placement plans is likely to be inaccurate.

Current solutions to these problems utilize inventory management software, point of sale systems, and tracking devices to manage inventory. However, the implementation of these solutions is largely dependent on data supplied by humans. This data can be inconvenient to collect, time-consuming to gather, and inaccurate. Some solutions include robotic inventory scanners that can be directed down aisles and around shelves in order to electronically manage inventory. However, these robotic scanners may include costly hardware, and may not be financially feasible for many proprietors.

Additionally, radio frequency identification (RFID) technology has been used in certain situations, but accurate positioning of passive RFID tags has historically been a difficult problem to solve due to environmentally-induced sensor noise and inconsistency of sensor data.

Thus, a heretofore unaddressed need exists in the industry to address the aforementioned deficiencies and inadequacies.

SUMMARY OF THE DISCLOSURE

Embodiments of the present disclosure provide a system, method, and an apparatus for micro-location of RFID tags within a spatial environment. Briefly described, in architecture, one embodiment of the system, among others, can be implemented as follows. The system includes a mobile platform having a known location within a three-dimensional (3D) space, wherein a plurality of radio frequency identification (RFID) tags is located within the 3D space. A plurality of RFID antennas is mounted on the mobile platform, wherein backscatter signals of at least one of the RFID tags are collected by at least one of the plurality of RFID antennas and time-synchronized with the known location of the mobile platform in the 3D space at a time of collection. A computerized processing device is in communication with the plurality of RFID antennas, wherein the computerized processing device performs algorithmic RFID tag localization using at least the collected backscatter signals of the at least one RFID tag and the time-synchronized known location of the mobile platform to determine a micro-location of the at least one RFID tag within the 3D space.

The present disclosure can also be viewed as providing methods for micro-location of RFID tags within a spatial environment. In this regard, one embodiment of such a method, among others, can be broadly summarized by the following steps: providing a plurality of radio frequency identification (RFID) tags within a three-dimensional (3D) space; moving a mobile platform within the 3D space, wherein the mobile platform has a known location; collecting, with a plurality of RFID antennas mounted on the mobile platform, backscatter signals of at least one of the RFID tags; time-synchronizing the collected backscatter signals with the known location of the mobile platform in the 3D space at a time of collection; and performing algorithmic RFID tag localization using at least the collected backscatter signals of the at least one RFID tag and the time-synchronized known location of the mobile platform, thereby determining a micro-location of the at least one RFID tag within the 3D space.

The present disclosure can also be viewed as providing a system for tracking a micro-location of RFID tags within a spatial environment. Briefly described, in architecture, one embodiment of the system, among others, can be implemented as follows. At least one radio frequency identification (RFID) tag is moving within a three-dimensional (3D) space. A plurality of RFID antennas is fixedly positioned within the 3D space, wherein backscatter signals of the at least one RFID tag is collected by at least one of the plurality of RFID antennas and time-synchronized with a known location of the at least one of the plurality of RFID antennas in the 3D space at a time of collection. A computerized processing device is in communication with the plurality of RFID antennas, wherein the computerized processing device performs algorithmic RFID tag localization using at least the collected backscatter signals of the at least one RFID tag and the time-synchronized known location of the at least one of the plurality of RFID antennas to determine a micro-location of the at least one RFID tag within the 3D space.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
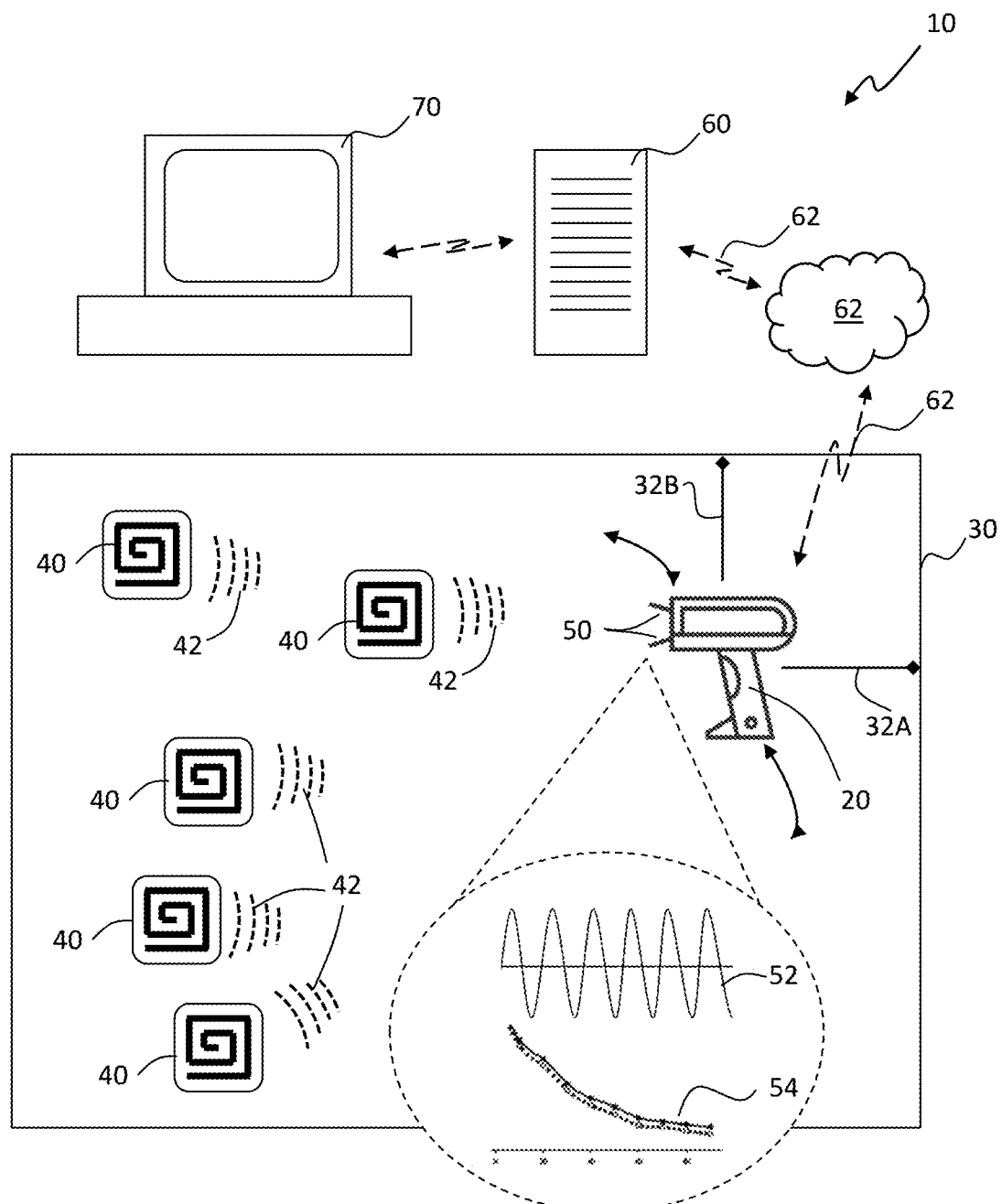
FIG. 1 is a diagrammatical illustration of a system for micro-location of RFID tags within a spatial environment, in accordance with a first exemplary embodiment of the present disclosure.

FIG. 1 is a diagrammatical illustration of a system for micro-location of RFID tags within a spatial environment 10, in accordance with a first exemplary embodiment of the present disclosure. The system for micro-location of RFID tags within a spatial environment 10, which may be referred to herein simply as 'system 10' includes mobile platform 20 having a known location within a three-dimensional (3D) space 30. A plurality of radio frequency identification (RFID) tags 40 is located within the 3D space 30. A plurality of RFID antennas 50 are mounted on the mobile platform 20. Backscatter signals 42 of at least one of the RFID tags 40 are collected by at least one of the plurality of RFID antennas 50 and time-synchronized with the known location of the mobile platform in the 3D space 30 at a time of collection. A computerized processing device 60 is in communication with the plurality of RFID antennas 50 through a network connection 62. The computerized processing device 60 performs algorithmic RFID tag localization using at least the collected backscatter signals 42 of the at least one RFID tag 40 and the time-synchronized known location of the mobile platform 20 to determine a micro-location of the at least one RFID tag 40 within the 3D space 30.

The system 10, and related systems and methods disclosed herein, can be used for micro-locating RFID tags within a 3D or 2D environment, which can be used with identifying the location or tracking the location of physical items on which an RFID tag is placed. This may have particular benefits for inventory control. For instance, conventionally, products are tagged with an RFID tag such that when the product enters or exists the facility, the RFID tag can be scanned to record the position or movement of the product. However, in modern inventory control, it is desirable to know more than just whether an inventory item has passed beyond a static point. It is desirable to know the quantity and specific location of inventory items within the spatial environment of a factory, warehouse, storage facility, commercial store, or any other 3D or 2D structure or setting. In accordance with this disclosure, the term 'inventory items' may be understood to mean products, goods, stock or other contents of a facility, Commonly these inventory items may be products displayed on shelves of the commercial facility such that one or more buyers can purchase the items, or an employee can locate the item within the facility. For example, the goods and products contained on the shelves of big box stores, warehouse stores, etc., including public and non-public facilities. Inventory items may also be goods or items which are not for sale but are displayed, contained, or otherwise stored on shelves or similar storage units. For example, museum collections stored in a warehouse, books in a library, equipment stored in a storage facility, etc.

The system 10 may be used to determine the micro-location of an RFID tag on an inventory item, such that the micro-location of the item itself can be determined. Within the context of the present disclosure, the term 'micro-location' or similar variants thereof, is characterized as determining the location of an RFID tag to within a cubic space of less than 1.5 feet relative to the spatial environment in which the RFID tag is located. More preferably, micro-location may be determining the location of the RFID tag to a cubic space of less than 1.0 feet, or less than 0.5 feet, or a smaller cubic space. In one example, the micro-location of the RFID tag can be determined down to a location of a five (5) inch cubic space. The spatial environment of the facility in which the RFID tag is located may be identified by the structural boundaries of the facility, e.g., the walls and roof of a building or the perimeters of a fenced-in enclosure, or it may be otherwise identified by other features of the facility, such as a non-structural division of the facility.

The mobile platform 20 of the system 10 may be any device which is movable within the 3D space 30, including robotic devices, wheeled platforms and vehicles, drones and aerial vehicles, hand-held movable platforms such as is depicted in FIG. 1, track-based platforms, or any other manual, autonomous, or semi-autonomous device which is capable of moving or being moved within the facility. The mobile platform 20 has a known location within the 3D space 30, such that the particular location of the mobile platform 20 can always, or substantially always, be known by the system 10. The known location of the mobile platform 20 within the 3D space 30 may be identified in various ways, such as coordinates, measurements, or otherwise using one or more ultra-wideband (UWB) devices, Light Detection and Ranging (LIDAR) devices, and/or 3D Simultaneous Localization and Mapping (SLAM) devices. In a rudimentary example, as depicted in FIG. 1, the location of the mobile platform 20 may be identified with simple coordinate measurements in two or more directions 32A, 32B. The known location allows for pinpointed, near real-time location information of the mobile platform 20, which is used by the system 10 along with other aspects to determine the location of the RFID tags 40. In one example, the accuracy of the system 10 is at the centimeter level, in that, the RFID tags 40 can be located to within a centimeter of accuracy within a 3D space. In other examples, the accuracy may be higher or lower, such as at the millimeter level, the multi-centimeter-level, or a meter-level.

A plurality of RFID tags 40 is located within the 3D space 30. This may include RFID tags 40 being positioned on products or inventory items (not shown in FIG. 1) which are placed on shelves, pallets, or other structures within the 3D space 30. The mobile platform 20 includes a plurality of RFID antennas 50 which are mounted on or to the mobile platform 20. The RFID antennas 50 may include various antenna devices and any quantity of RFID antennas 50 may be included.

In operation, the mobile platform 20 is moved through the 3D space 30. While it is moving or during momentary stops, the mobile platform 20 receives one or more backscatter signals 42 from one or more of the RFID tags 40. For clarity in disclosure, receiving backscatter signals 42 from a single RFID tag 40 is used herein, but it is noted that the mobile platform 20 may receive a plurality of backscatter signals 42 from a plurality of RFID tags 40 simultaneously. The backscatter signals 42 are collected by one or more of the plurality of RFID antennas 50 and time-synchronized with the known location of the mobile platform 20 in the 3D space 30 at a time of collection, such that the precise location of the RFID antennas 50 are known when the backscatter signal 42 is picked up.

Next, a computerized processing device 60 in communication with the plurality of RFID antennas 50 through a network connection 62 is used to process data related to the backscatter signals 42 and the known location data of the RFID antennas 50. The computerized processing device 60 may include a server or other computing device which runs one or more tag micro-localization applications or programs. For example, one such program is known as SmartTrace™, which uses algorithmic processing based on a set of algorithms from various RFID tag localization techniques or approaches in order to provide a statistically accurate determination of the location of the RFID tag 40 within the 3D space 30 in near real-time. This algorithmic processing may include any number of different RFID tag localization techniques or approaches, including approaches which process the phase, power value, received signal strength indicator (RSSI), and other data from the RFID antennas 50 to determine the location of the RFID tags 40 which emitted the received radio signal. The eventual output of the computerized processing device 60 may be communicated or displayed on a user computing device 70, which may be located nearby or remote, and may include any type of computing device.

One approach for RFID tag localization includes using the collected RFID backscatter signals 42 over a period of time to create a history of phase and RSSI data received as the mobile platform 20 moves across the RFID tags 40. The algorithmic processing of the tag micro-localization application evaluates millions of possible RFID tag 40 locations and then conducts a simulation for the signal. Specifically, the tag micro-localization application simulates what the signal received by the antenna 50 would look like if it originated from a particular, estimated location. A large quantity of these simulations is run, which creates a history of phase 52 and received signal strength indicator (RSSI) 54 of the collected backscatter signals of the RFID tag over a period of time. Possible RFID tag locations are evaluated and a received signal phase and RSSI is simulated. Then the history of phase and RSSI of the collected backscatter signals is matched to the simulated received signal phase and RSSI. The location of an RFID tag 40 whose simulated signal is the closest match to the actual signal received by the RFID antenna 50 is given the highest weight, such that this signal is most likely to indicate the actual position of the RFID tag 40. In this approach, the plurality of RFID antennas 50 mounted on the mobile platform 20 may be mounted facing laterally relative to a direction of movement of the mobile platform 20.

It is noted that a graphical processing unit (GPU), a specialized electronic processor designed to rapidly manipulate and alter memory to accelerate the creation of images in a frame buffer intended for output to a display device, is used to optimize these simulations resulting in up to 2000 times faster simulation speeds as compared to a traditional quad-core CPU. This allows the calculations to be conducted in near real-time.

Another approach for RFID tag localization includes utilizing a machine learning model that takes as its inputs key features of the received signal and the location of the receiving RFID antenna 50 and maps out possible locations of the RFID tags 40 within the 3D space 30. For example, using deep learning techniques, the machine learning model may be fed the data from the RFID antennas 50 as well as the real position of the RFID tags 40 in order to effectively train the machine learning model. The machine learning model learns to recognize key patterns in the data such as the correlation between peak RSI and/or change in Doppler shift as the mobile platform 20 moves past the RFID tag 40, allowing it to estimate the location of the RFID tag 40.

Figure 2:
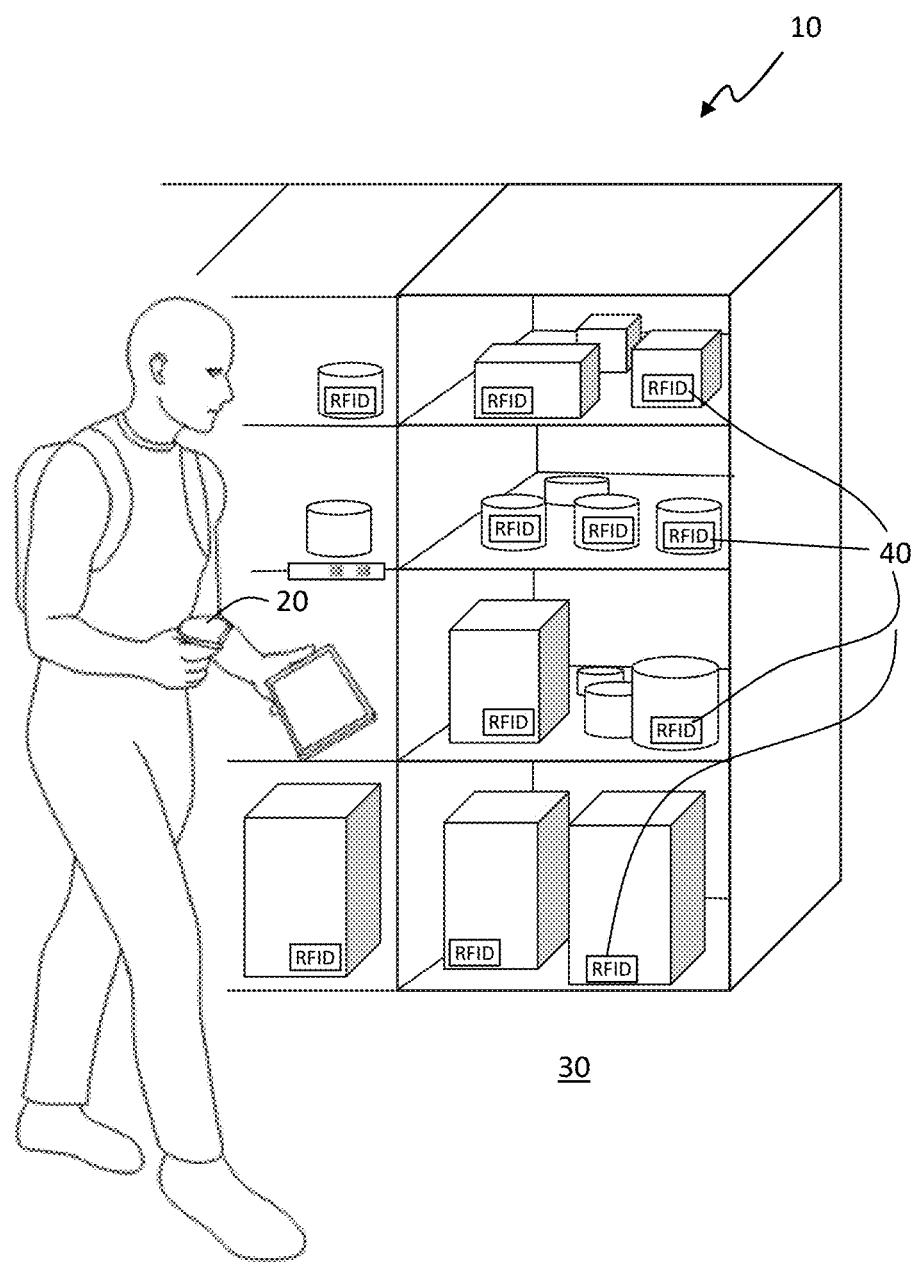
FIGS. 2-4 are diagrammatical illustrations of the system for micro-location of RFID tags within a spatial environment of FIG. 1, in accordance with the first exemplary embodiment of the present disclosure.
Figure 3:
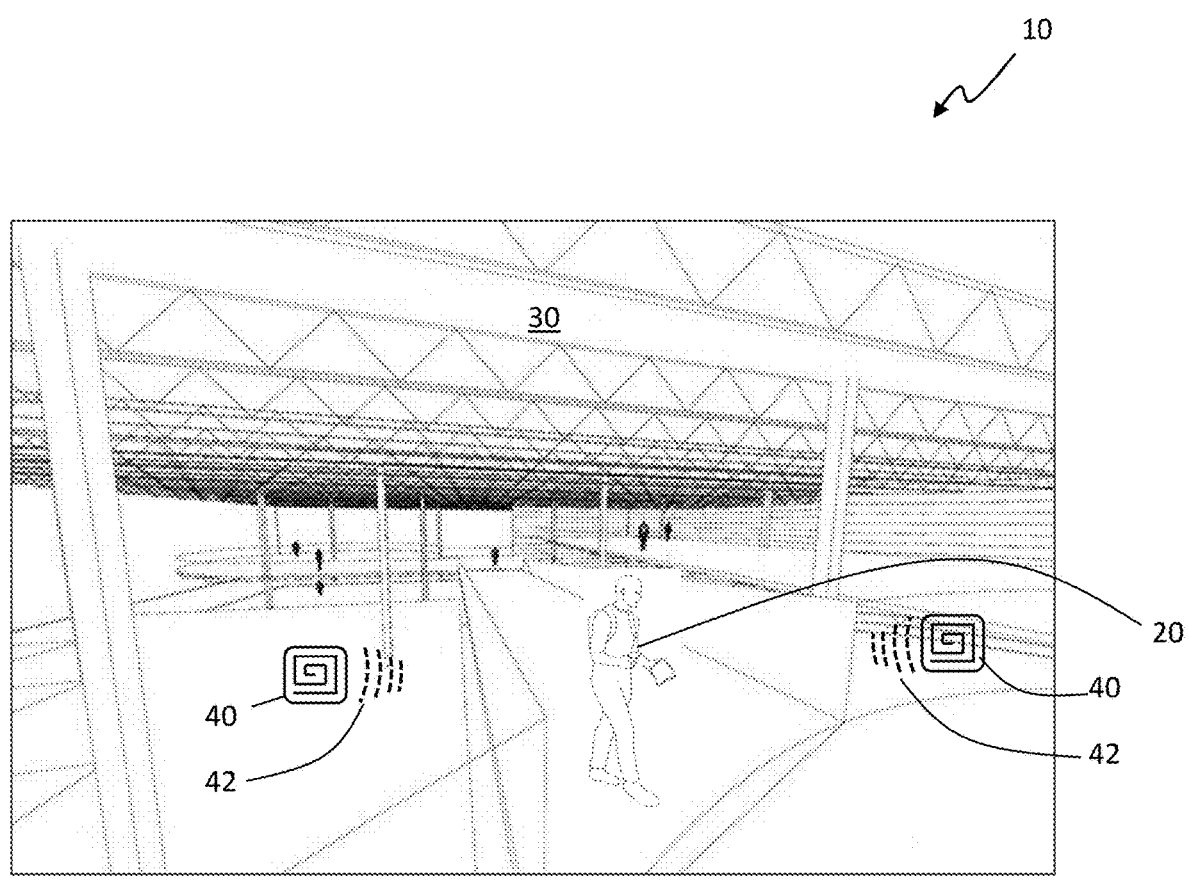
Figure 4:
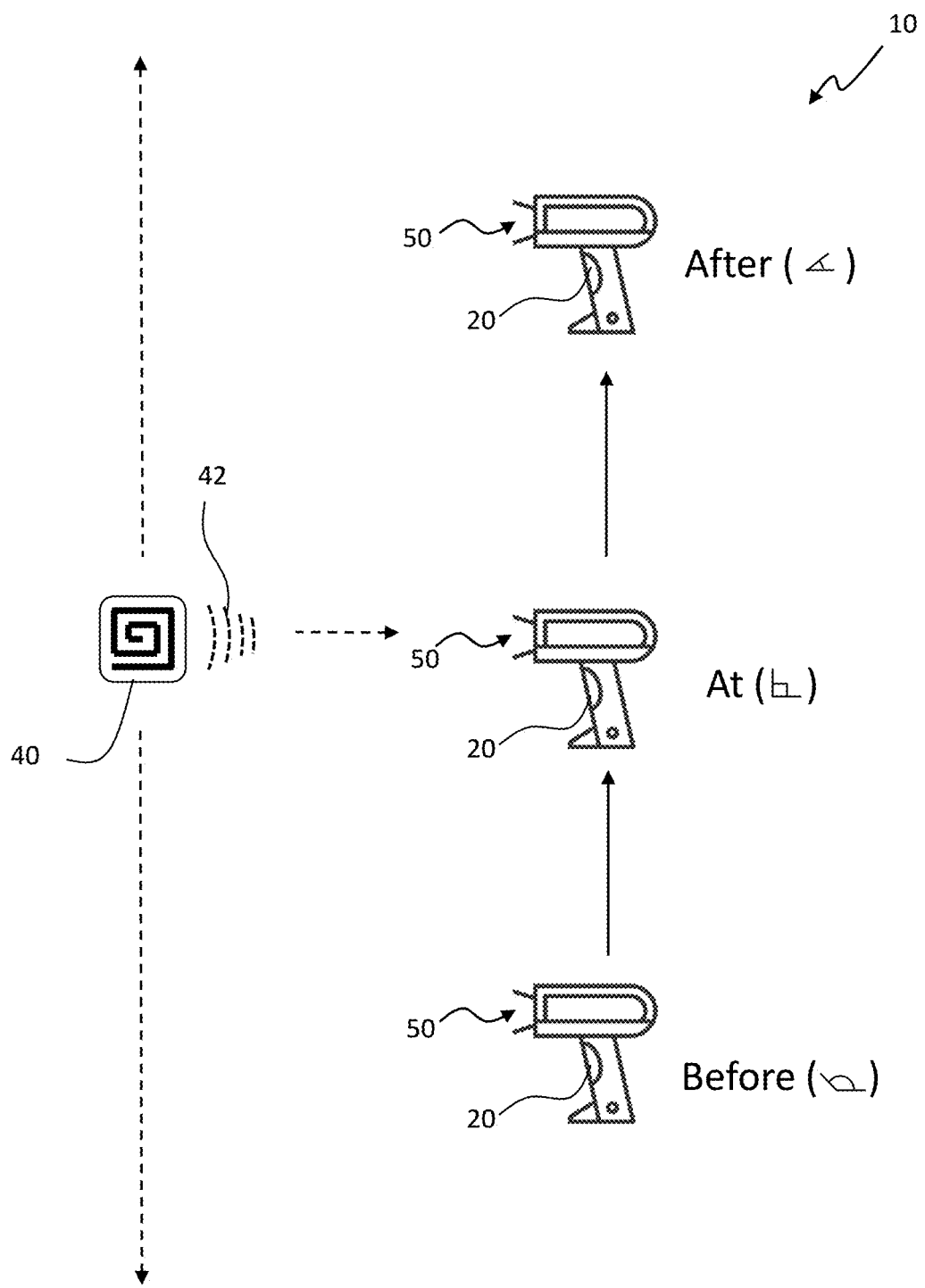

For certain approaches of the RFID tag localization, the correlation between the movement and/or orientation of the RFID antennas 50 on the mobile platform 20 and the RFID tag 40 signal data can be used. FIGS. 2-4 are diagrammatical illustrations of the system for micro-location of RFID tags within a spatial environment 10 of FIG. 1, in accordance with the first exemplary embodiment of the present disclosure. In particular, FIGS. 2-4 illustrate situations where the RFID antennas 50 on the mobile platform 20 may be moved relative to the RFID tags 40. As shown in FIGS. 2-3, a human user may carry the mobile platform 20 throughout the 3D space 30, moving past a plurality of RFID tags 40.

As shown in FIG. 4, another approach for RFID tag localization includes a machine learning model to determine the micro-location of the RFID tags 40 based on correlations between a relative position of the mobile platform 20 and the collected backscatter signals 42 of the RFID tag 40 and the time-synchronized known location of the mobile platform

20. Specifically, the signal data from the RFID antennas 50 is labeled as either 'before', 'at', or 'after' which would correspond to when the RFID antennas 50 were reading backscatter signals 42 before facing the RFID tag 40, as shown on the bottom, facing perpendicular to the RFID tag 40 as shown in the middle, then after having moved past the RFID tag 40 as shown on the top, respectively. The machine learning model would be able to rain on this data and learn to recognize when at what position the RFID antenna 50 was directly facing the RFID tag 40. Once trained, the machine learning model may conduct RFID tag micro-localization without manual data inputs. This approach would help narrow down the search space for RFID tag 40 localization, which in turn, allows other parts of the algorithmic processing to more efficiently narrow down on the micro-location of the RFID tag 40.

Figure 5:
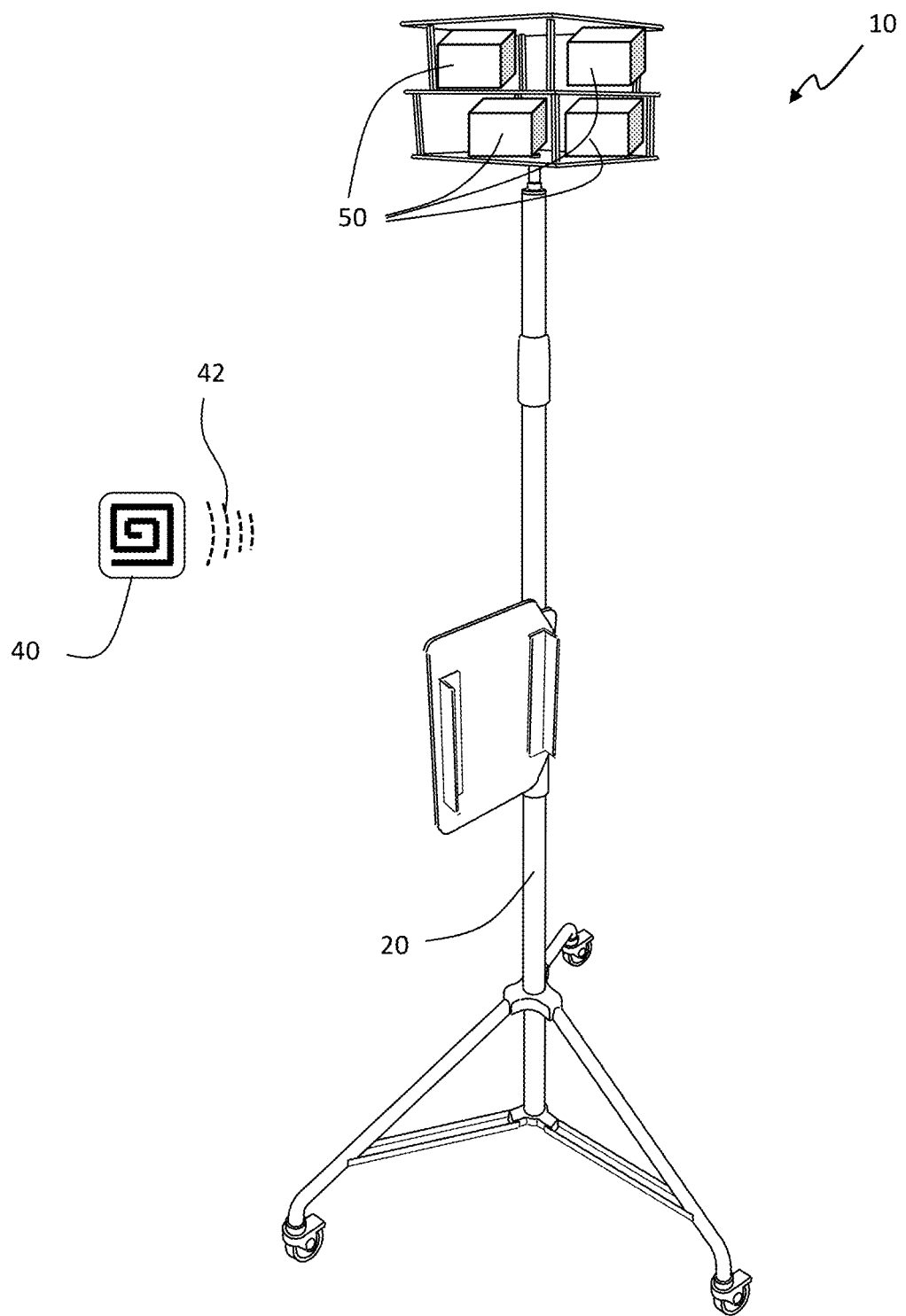
FIGS. 5-7 are diagrammatical illustrations of the system for micro-location of RFID tags within a spatial environment of FIG. 1, in accordance with the first exemplary embodiment of the present disclosure.
Figure 6:
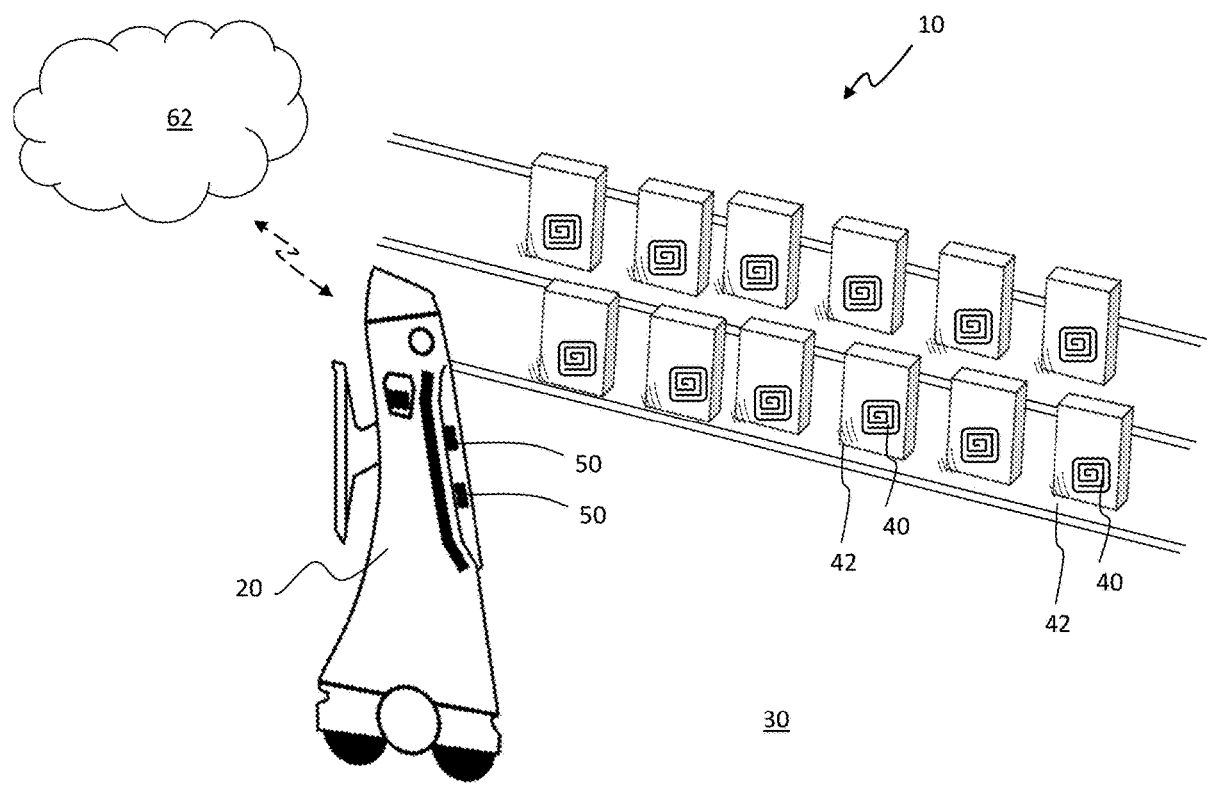
Figure 7:
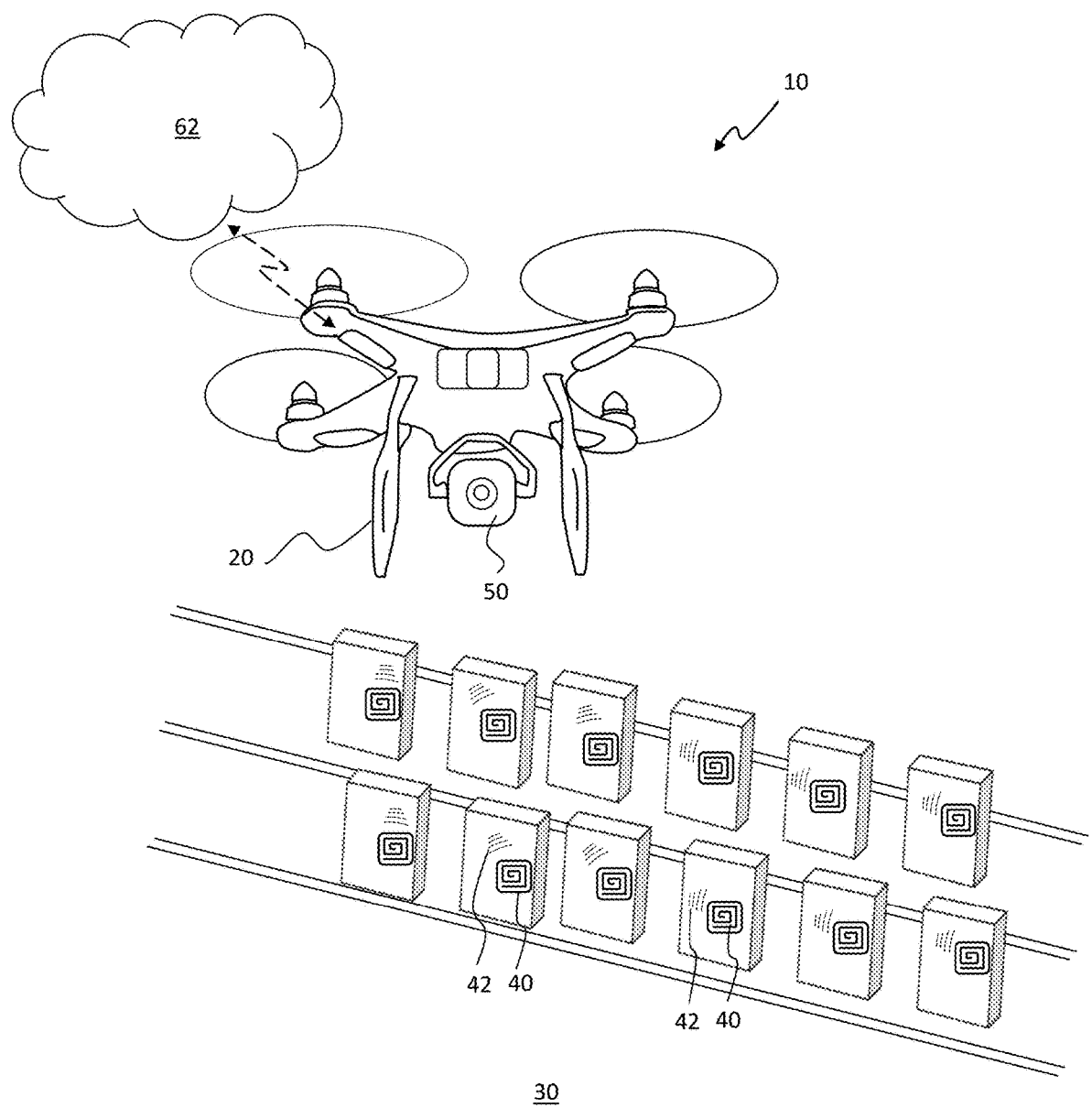

While FIGS. 2-3 illustrate examples of the mobile platform 20 being a device which is carried by a human user, the mobile platform 20 may also be a vehicular device which is operated manually, autonomously, or semi-autonomously. For example, FIGS. 5-7 are diagrammatical illustrations of the system for micro-location of RFID tags within a spatial environment 10 of FIG. 1, in accordance with the first exemplary embodiment of the present disclosure, where the mobile platform is manually-moved wheeled device, an autonomous wheeled robotic unit, or an aerial robotic unit, respectively. In each of these situations, the mobile platform 20 carrying the RFID antennas 50 may be moved past RFID tags 40 within the 3D space and receive the RFID backscatter signals 42 therefrom.

Another approach for RFID tag localization includes associating the collected backscatter signals 42 of the RFID tag 40 with emitted interrogation signals. The micro-location of the RFID tag 40 is determined using triangulation based on a time between an emission and a collection of the interrogation signals. This so-called 'time-of-flight' approach may utilize a custom designed RFID reader which is capable of associating backscatter signals 42 received with specific interrogation signals emitted. With the time between emission and reception known, and combined with the phase information of the arriving wave, accurate distances to an RFID tag 40 can be calculated. Triangulation can then be employed to derive the micro-location of the RFID tag 40.

Another approach for RFID tag localization includes a Doppler frequency shift analysis approach that looks at the rate of change of the Doppler shift of the RFID signal 42 as the mobile platform 20 moves past the RFID tag 40. In this approach, closer RFID tags 40 demonstrate a higher rate of change of Doppler shift as the relative velocity of the mobile platform 20 changes quicker than compared to a RFID tag 40 located further away. With the information of the position of the mobile platform 20 over time being known, the absolute velocity of the mobile platform 20 can be deduced. In turn, this can be used to predict the relative movement of the RFID tag 40 which can be used to determine the tag's micro-location.

While various approaches for RFID tag localization are described herein, it is noted that other approaches may also be used, alone or in combination with the approaches and techniques described here. Moreover, variations of the approaches may exist such that aspects described relative to certain approaches can be included with other approaches. In operation, the system 10 may use one or more RFID tag localization approaches, depending on the particular scenario the system 10 is used within. For example, certain approaches may be used to narrow down the localization of the RFID tag 40 to within certain spatial parameters and then other approaches can be used to further refine the location such that the micro-location of the RFID tag 40 can be accurately identified. In one example, the RSSI of a RFID tag 40 can be used to specify at which point the backscatter signal 42 was strongest, which narrows down the tag location. Then, other approaches can be used to refine and precisely identify the RFID tag's 40 true location within the 3D space 30. The final output in most situations is a combination of two or more approaches, but for certain scenarios, depending on how the RFID tag 40 is placed, how the mobile platform 20 is moving, and other factors, it may be possible to use only a portion of the approaches. It is further noted that the system 10 may utilize internal heuristics to determine which approach or combination of approaches provide the best result. This may include providing an end use with a confidence metric or value which indicates the likelihood of a RFID tag's detected location to its true location.

As can be seen herein, the system 10, and related methods and apparatuses disclosed herein, improves over the historically difficult problem of accurate positioning of passive RFID tags by combining manual or robot simultaneous localization and mapping (SLAM) technology with a novel approaches using algorithmic processing to calculate the possible origination points of a series of received RFID signals. This improvement stems from the capability accorded by SLAM to obtain pinpoint positions of the mobile platform at any givers instance in time while the system is in operation. On top of such a system, a number of RFID antennas 50 have been integrated on the mobile platform 20 facing laterally on both sides, thereby effectively scanning in a direction perpendicular to the direction of mobile platform 20 motion. The integration, in addition to other hardware aspects, for example, ideal height placements and distributions for optimal coverage of an average warehouse storage facility, may be important to the acute functioning of micro-location of the RFID tags 40.

Of particular note, the RFID reader connected to the RFID antennas 50 that processes and interprets the received RFID backscatter signals 42 is time synchronized with the known location of the mobile platform 20 that is actively executing SLAM, via a local Network Time Protocol server configuration. This enables every backscatter RFID signal 42 received from a scanned RFID tag 40 to be paired with the precise location of the RFID antenna 50 which received that specific signal at that specific instant in time, up to the nanosecond. Additionally, for each RFID antenna 50 installed on the mobile platform 20, the system empirically establishes a profile of a RFID tag's 40 actual orthogonal distance from the path of mobile platform 20 traversal to the peak RSSI of the signals received associated with the RFID tag 40. This may yield an estimate of the RFID tag's 40 true location within the 3D space 30.

Most conventional RFID localization methods today are based upon RSSI readings which are unpredictably inaccurate and unreliable, as they are severely affected by a host of extrinsic environmental factors that are usually impractical to control. To improve over these conventional methods, the subject system, apparatus, and method refines the estimate from the RSSI. Accordingly, the refinement includes a series of time-ordered received RFID signals 42 from a specific RFID tag 40. The data by the RFID antenna 50 which received the signal is segregated. Each time-ordered signal series that is obtained not only contains RSSI information and the position of the RFID antenna 50 when each signal was detected, but also the phase of the signal as it was received. RFID signals, being electromagnetic waves, can be accurately represented as sinusoidal waveforms with a periodicity equal to the inverse of the wave's frequency. In each period, the wave undergoes a cycle as it propagates through its transmission medium and covers the distance of a single wavelength. The phase of the signal describes the position on the cycle which the wave was at, at the point when it came into contact with the RFID antenna's 50 surface of reception and was read as a received RFID backscatter signal 42. This phase information gives an order of magnitude of deeper granularity into the application of RFID tag 40 positioning relative to any conventional system.

Figure 8:
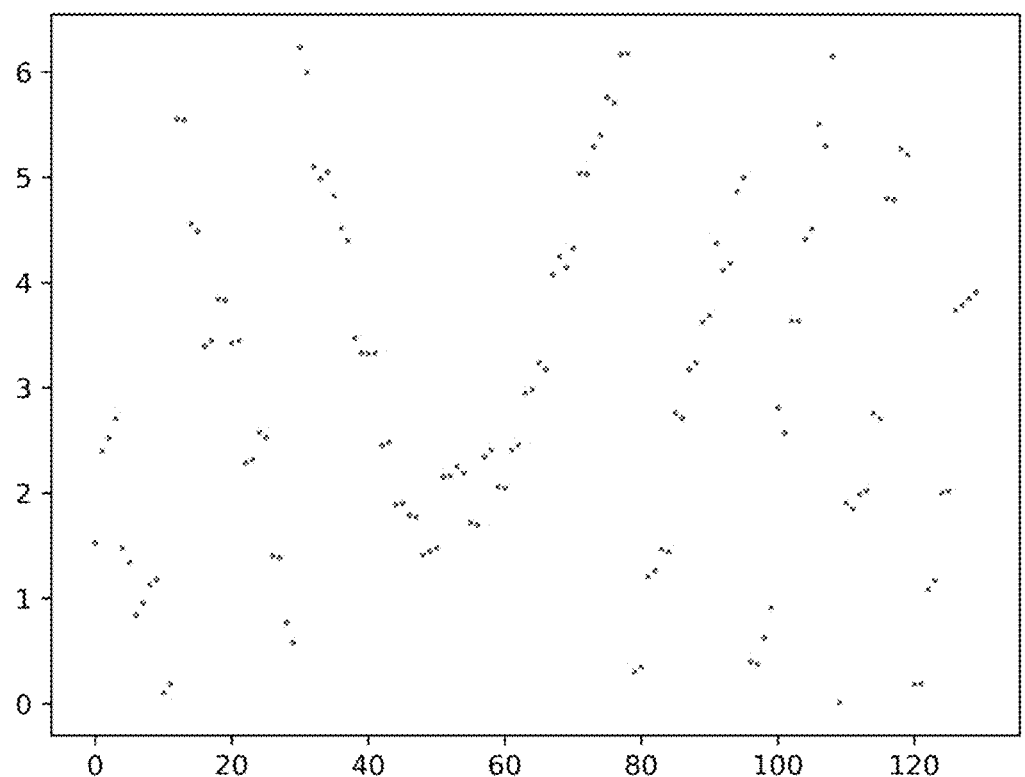
FIGS. 8-10 are graphical illustrations of the system for micro-location of RFID tags within a spatial environment of FIG. 1, in accordance with the first exemplary embodiment of the present disclosure.
Figure 9:
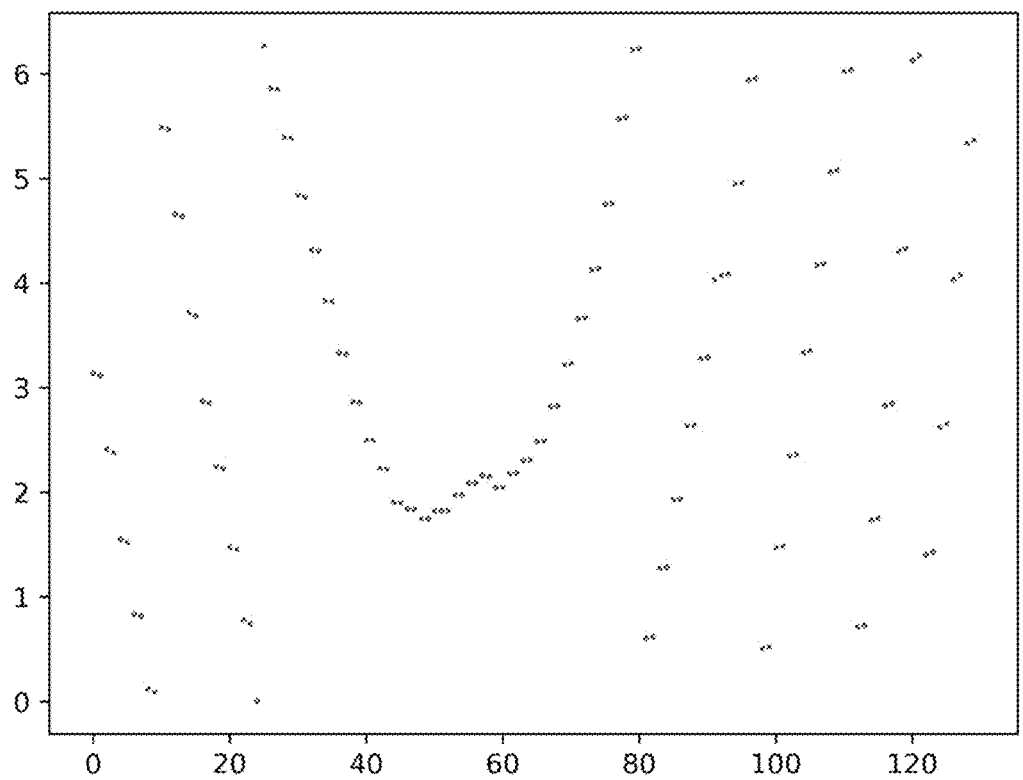
Figure 10:
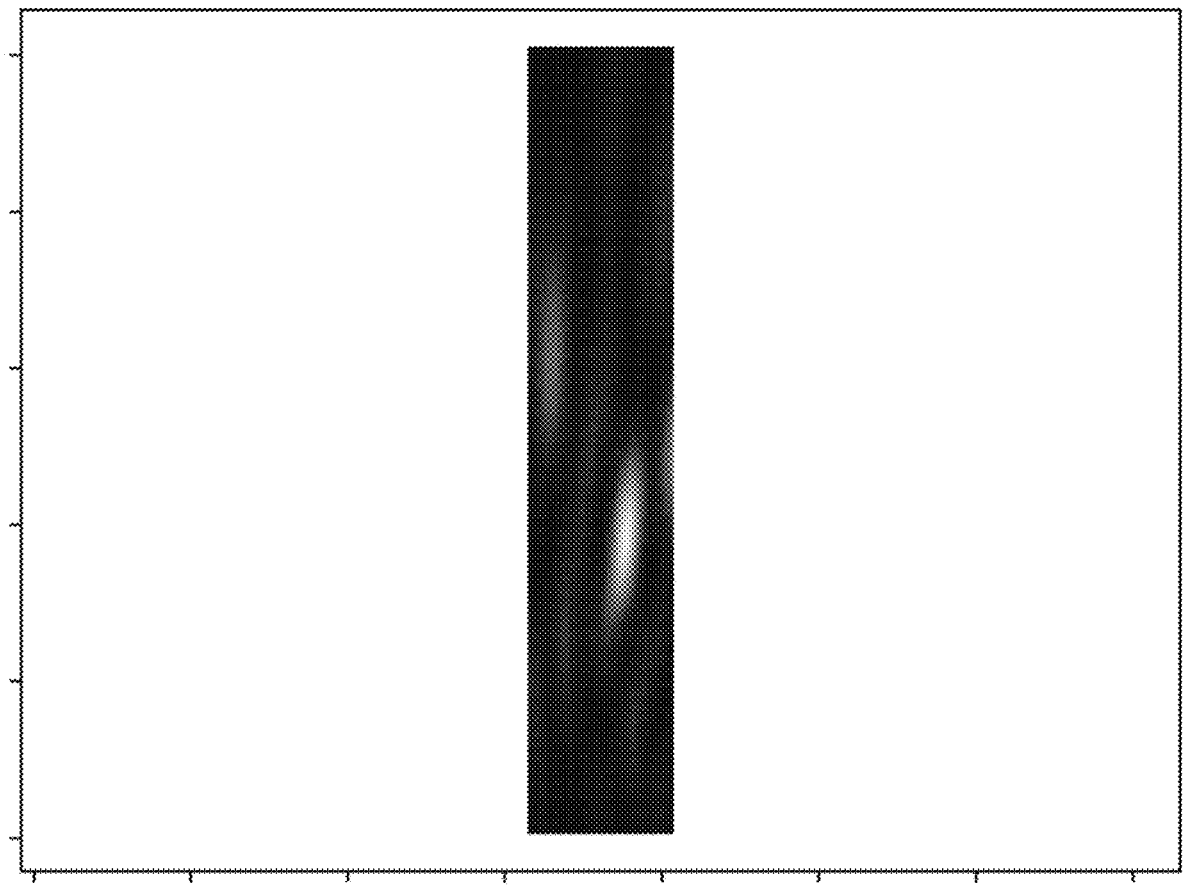

As an example of the system's 10 functioning described herein, FIGS. 8-10 are graphical illustrations of the system for micro-location of RFID tags within a spatial environment 10 of FIG. 1, in accordance with the first exemplary embodiment of the present disclosure. In particular, FIG. 8 depicts the time-ordered series of actual phase information collected from a specific RFID tag by a specific antenna, which is one of the data points collected from the RFID antennas. In operation, the phase of the signal is received and detected by the antennas from the RFID tags and the phase values are plotted as the RFID antenna is moved. In comparison, FIG. 9 illustrates the theoretical phase pattern. This is based on an assumption of what the theoretical phase data for the RFID tag at a particular location. When the theoretical phase patterns of FIG. 9 match, or substantially match, with the phase patterns actually collected, it can be deduced that the estimated location of the RFID tag substantially matches the actual location.

This information can be provided to users in the form of a heat map which illustrates the micro-location of the RFID tag in a 3D space. FIG. 10 illustrates an example of the heat map, which is effectively a cuboid representation of the immediate spatial environment of the RFID tag. Here, a correlation function may be used to provide a number or value for how accurate the match is between the detected phase data and the theoretical phase data, i.e., the match between the graphs in FIGS. 8-9. This can be used to provide a probability that a specific RFID tag is in a particular 3D space. As shown in FIG. 10, the bright spots show the high correlation factor spots, whereas dark areas shows a low correlation factor. The high correlation factor spots indicated that the RFID tag is most likely to be located at that position and less likely to be located at the positions indicated by the dark spots. In use, one heat map may be employed for each RFID tag, such that there is only one high correlation spot (bright yellow or white spot) in each heat map. Since the heat map is keyed to the 3D spatial environment based on the location of the mobile platform and the RFID antenna which detected the RFID tag, the location of the correlation factor can be deduced. It is noted that multiple heat maps can be used over time to plot the coordinates of the RFID tags.

With reference again to FIGS. 1-10 overall, with each time-ordered signal series, the system first forms an accurate depiction of the path taken by the receiving antenna, characterized by the specific points in space as the positions at which each signal in the series was received. Then, the system analyzes the 3D space around the location estimated by RSSI where the RFID tag 40 should be. In one example, the 3D space around the location estimate is approximately 80 cm tall, 65 cm wide, and 300 cm long, but other dimensions may be used in other situations. This space is then split into smaller, individual spaces. For example, this space may be split into 1 cm cubes. In this example, for each one of these 1 cm cubes, the hypothesis of the RFID tag 40 being at that location and occupying that space is tested. The system effectively supposes that if the RFID tag's 40 true location was at that specific spot in 3D space, what would have been the phase of the received signal at the RFID antenna 50, when the RFID antenna 50 was at each of the positions described by the aforementioned time-ordered series.

These calculations can be performed because the system has the precise absolute Euclidean distance between the supposed 1 cm-cube and each of the RFID antenna's 50 positions. Thus, the modulo operation is performed on each of these Euclidean distances with the wavelength of the RFID signal emitted by the reader to obtain a series of theoretical ideal phase values that corresponds with the tested 1 cm-cube and the path taken by the antenna. Next, the system takes this theoretical phase series and passes it through a cross-correlation function with the actual recorded phase series. This produces a correlation factor, a fraction that ranges between 0 and 1, which represents the similarity of the theoretical data to the actual data, with 1 being exactly alike. The correlation factors associated with each of the 1,560,000 1 cm cubes in the 3-dimensional space under study, in this example, are compared, and the one with the highest correlation is therefore picked as the RFID tag's 40 most likely location.

It is noted that RFID signals are prone to reflection when there's a lot of noise in the environment, especially when there are a lot of metal objects. This causes the signal to bounce between various structures which makes RFID tag localization difficult since it is likely to indicate virtual positions which are not actually true. The subject system eliminates this risk because it uses not only the RFID signal itself, but the phase of that signal, so it can accurately predict the probability of the RFID tag being in a particular location. Moreover, the subject system doesn't only analyze a phase at any one given instance, but rather, it analyzes the series of phase values over time, as the antenna moves. This helps narrow down on the position of the RFID tag.

In addition to the benefits of the system 10 as described herein, the system 10 also provides improved computer processing performance. Specifically, performing calculations on 1.5 million individual points in space for every RFID tag 40 scanned by each RFID antenna 50 can be computationally intensive. Indeed, in test examples, it has been demonstrated that it takes up to 336 hours to compute the locations of a set of 140 RFID tags, while using traditional computational methods involving an 8-core CPU. However, the system 10 executes the algorithm for the calculations using General Purpose Computing on Graphics Processing Units (GPGPU). With GPGPU, the locations of the same set of 140 RFID tags 40 were calculated in merely 10 minutes. Thus, as a whole, the subject system and method described herein can produce pinpoint locations of passive RFID tags in real-time.

Figure 11:
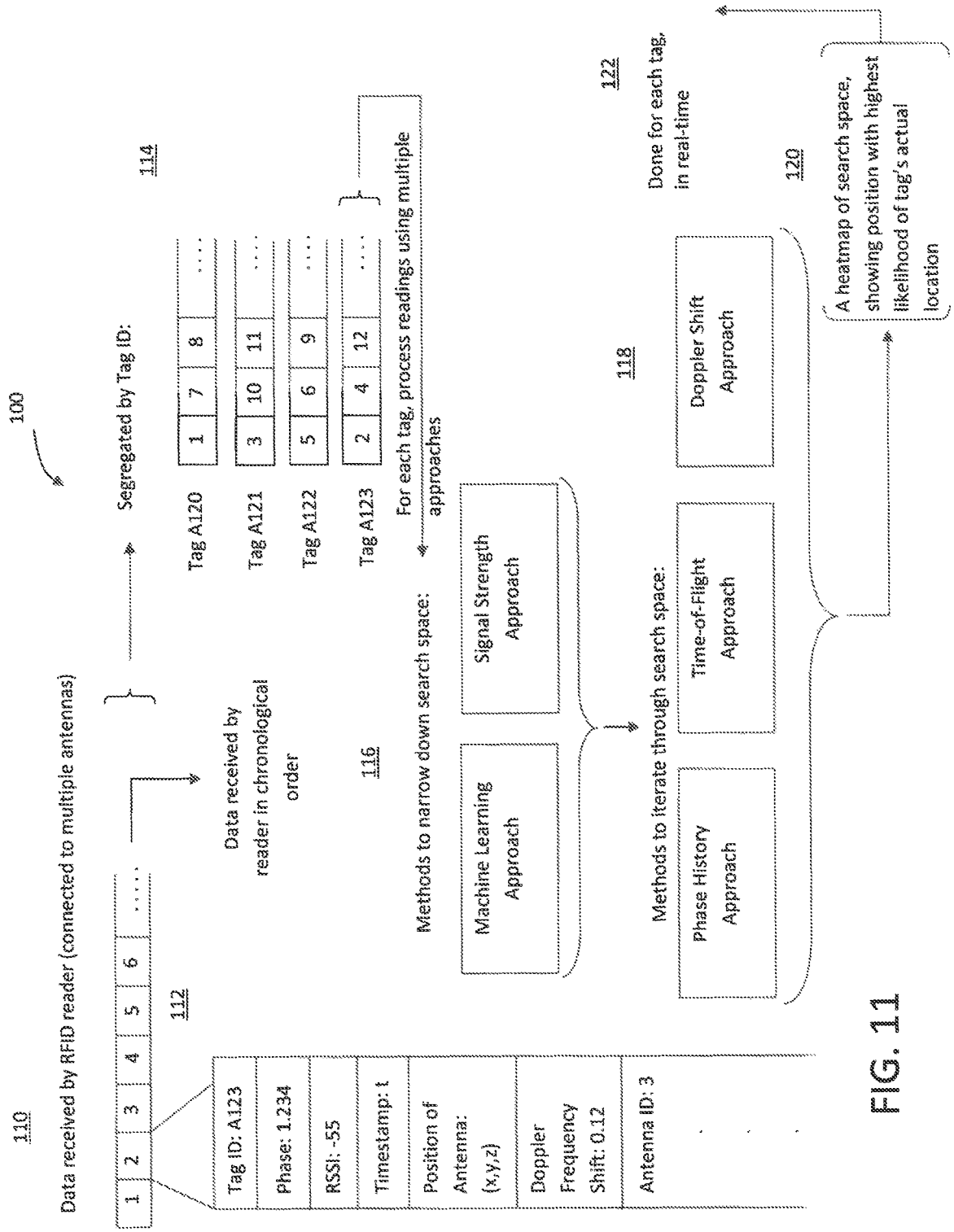
FIG. 11 is a flowchart illustrating a method for micro-location of RFID tags within a spatial environment, in accordance with the first exemplary embodiment of the disclosure.

FIG. 11 is a flowchart 100 illustrating a method for micro-location of RFID tags within a spatial environment, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As shown, at position 110, data from RFID tags is received by an RFID reader having or connected to multiple antennas. As shown at position 112, at the time of receiving the RFID tag signal data, the system detects or records various data points, including the RFID tag ID, a phase value, an RSSI value, a timestamp, a position of the antenna (x, y, z), a Doppler frequency shift, and a RFID antenna ID. Other information may be received or detected as well. The data may be received by the reader in chronological order or in another order. Next, at position 114, the received data is segregated by RFID tag ID. For each RFID tag, one or more RFID tag localization processing approaches may be used, as shown at position 116, to initially narrow down the search space. These may include machine learning approaches, signal strength approaches, and others described herein relative to other figures. Then, other approaches may be used to iterate through search space, as shown at position 118. These approaches may include a phase history approach, a time-of-flight approach, and a Doppler shift approach. It is then possible to generate the heat map of the search space which shows the position with the highest likelihood of the RFID tag's actual location, as indicated at position 120. This analysis and processing may be done for each of the RFID tags in real-time or near-real-time.

The method described herein may also include any number of additional steps or variations thereto. For example, the method may include using a mobile platform within the 3D space with a plurality of RFID antennas mounted on the mobile platform in a direction facing laterally relative to a direction of movement of the mobile platform. During algorithmic RFID tag localization, the method may include creating a history of phase and received signal strength indicator (RSSI) of the collected backscatter signals of the RFID tag over a period of time, evaluating possible RFID tag locations, simulating a received signal phase and RSSI, and matching the history of phase and RSSI of the collected backscatter signals to the simulated received signal phase and RSSI. As discussed herein relative to other figures, algorithmic RFID tag localization may include utilizing a machine learning model to recognize patterns in the collected backscatter signals, wherein the micro-location of the RFID tag within the 3D space is determined. A machine learning model may be used to determine the micro-location of the RFID tag based on correlations between a relative position of the mobile platform and the collected backscatter signals of the RFID tag and the time-synchronized known location of the mobile platform. Other approaches may associate the collected backscatter signals of the RFID tag with interrogation signals emitted, wherein the micro-location of the RFID tag is determined triangulation based on a time between an emission and a collection of the interrogation signals, and/or analyzing a Doppler frequency shift as the mobile platform moves past the RFID tag.

Figure 12:
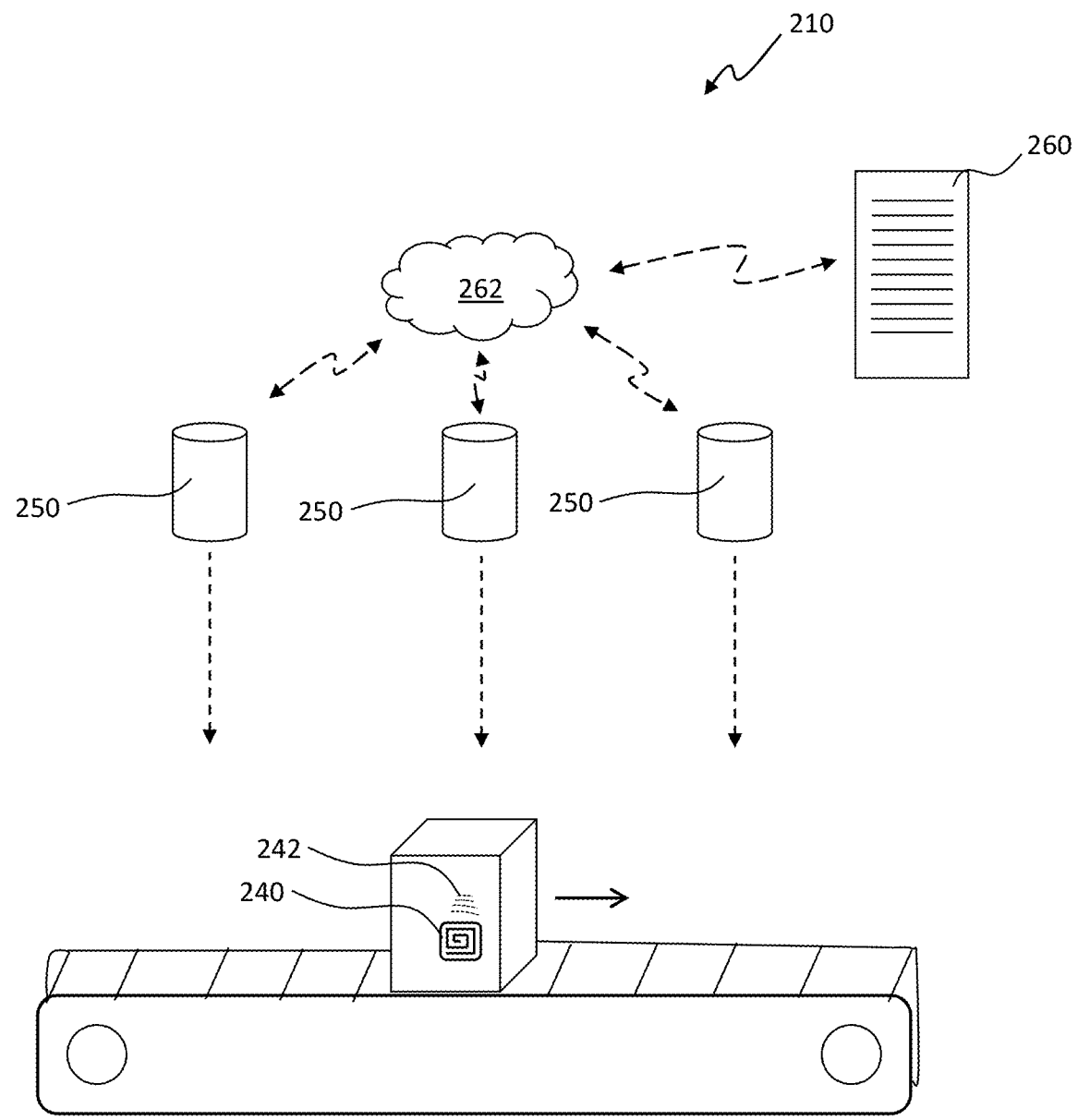
FIG. 12 is a diagrammatical illustration of a system for tracking a micro-location of RFID tags within a spatial environment, in accordance with a second exemplary embodiment of the present disclosure.

FIG. 12 is a diagrammatical illustration of a system for tracking a micro-location of RFID tags within a spatial environment 210, in accordance with a second exemplary embodiment of the present disclosure. The system for tracking a micro-location of RFID tags within a spatial environment 210, which may be referred to herein simply as 'system 210' includes many of the same features as discussed relative to FIGS. 1-11. However, in the system 210, the RFID antennas 250 remain stationary while the RFID tags 240 are mobile, e.g., such as when the RFID tags 240 are attached to products which are moving through a 3D space 230 on a conveyer belt system or other transportation system. As shown, at least one RFID tag 240 is moving within a three-dimensional (3D) space 230. A plurality of RFID antennas 250 are fixedly positioned within the 3D space 230, wherein backscatter signals 242 of the at least one RFID tag 240 is collected by at least one of the plurality of RFID antennas 250 and time-synchronized with a known location of the at least one of the plurality of RFID antennas 250 in the 3D space 230 at a time of collection. A computerized processing device 260 is in communication with the plurality of RFID antennas 250. The computerized processing device 260 performs algorithmic RFID tag localization using at least the collected backscatter signals 242 of the at least one RFID tag 240 and the time-synchronized known location of the at least one of the plurality of RFID antennas 250 to determine a micro-location of the at least one RFID tag 240 within the 3D space 230.

It is noted that the RFID antennas may be fixedly positioned on a door, proximate to a conveyor belt, on a stationary mechanical device, and/or on another structure of the 3D space 230. The plurality of RFID antennas 250 may be mounted facing laterally relative to a direction of movement of the at least one RFID tag 240. The processing used by the system 210 may be the same as previously described relative to FIGS. 1-11 with the exception that the RFID antenna 250 is located in a stationary position and the movement occurs by the RFID tag 240 itself. For example, algorithmic RFID tag localization may include creating a history of phase and received signal strength indicator (RSSI) of the collected backscatter signals of the at least one RFID tag over a period of time, evaluating possible RFID tag locations, simulating a received signal phase and RSSI, and matching the history of phase and RSSI of the collected backscatter signals to the simulated received signal phase and RSSI. The algorithmic RFID tag localization may further include utilizing a machine learning model to recognize patterns in the collected backscatter signals, wherein the micro-location of the at least one RFID tag within the 3D space is determined. The algorithmic RFID tag localization may utilize a machine learning model to determine the micro-location of the at least one RFID tag based on correlations between a relative position of the at least one of the plurality of RFID antennas and the collected backscatter signals of the at least one RFID tag and the time-synchronized known location. The algorithmic RFID tag localization may associate the collected backscatter signals of the at least one RFID tag with interrogation signals emitted, wherein the micro-location of the at least one RFID tag is determined triangulation based on a time between an emission and a collection of the interrogation signals. The algorithmic RFID tag localization may also analyze a Doppler frequency shift as the at least one RFID tag moves past the at least one of the plurality of RFID antennas.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system for micro-location of RFID tags within a spatial environment comprising:

a mobile platform having a known location within a three-dimensional (3D) space, wherein a plurality of radio frequency identification (RFID) tags are located within the 3D space;

a plurality of RFID antennas mounted on the mobile platform, wherein backscatter signals of at least one of the RFID tags are collected by at least one of the plurality of RFID antennas and time-synchronized with the known location of the mobile platform in the 3D space at a time of collection; and a computerized processing device in communication with the plurality of RFID antennas, wherein the computerized processing device performs algorithmic RFID tag localization using at least the collected backscatter signals of the at least one RFID tag and the time-synchronized known location of the mobile platform to determine a micro-location of the at least one RFID tag within the 3D space;

wherein the algorithmic RFID tag localization further comprises:

creating a history of phase and received signal strength indicator (RSSI) of the collected backscatter signals of the at least one RFID tag over a period of time;

evaluating possible RFID tag locations; simulating a received signal phase and RSSI; and matching the history of phase and RSSI of the collected backscatter signals to the simulated received signal phase and RSSI.

2. The system of claim 1, wherein the mobile platform further comprises at least one of: a wheeled platform, a handheld platform, a robotic platform, a drone platform, a track-based platform, and an aerial platform.

3. The system of claim 1, wherein the plurality of RFID antennas mounted on the mobile platform are mounted facing laterally relative to a direction of movement of the mobile platform.

4. The system of claim 1, wherein the algorithmic RFID tag localization further comprises utilizing a machine learning model to recognize patterns in the collected backscatter signals, wherein the micro-location of the at least one RFID tag within the 3D space is determined.

5. The system of claim 1, wherein the algorithmic RFID tag localization further comprises utilizing a machine learning model to determine the micro-location of the at least one RFID tag based on correlations between a relative position of the mobile platform and the collected backscatter signals of the at least one RFID tag and the time-synchronized known location of the mobile platform.

6. The system of claim 1, wherein the algorithmic RFID tag localization further comprises associating the collected backscatter signals of the at least one RFID tag with interrogation signals emitted, wherein the micro-location of the at least one RFID tag is determined triangulation based on a time between an emission and a collection of the interrogation signals.

7. The system of claim 1, wherein the algorithmic RFID tag localization further comprises analyzing a Doppler frequency shift as the mobile platform moves past the at least one RFID tag.

8. The system of claim 1, wherein the algorithmic RFID tag localization further comprises using two or more RFID tag localization techniques.

9. The system of claim 1, wherein the location of the mobile platform within the 3D space is known using: one or more ultra-wideband (UWB) devices; one or more Light Detection and Ranging (LIDAR) devices; and/or one or more 3D Simultaneous Localization and Mapping (SLAM) devices.

10. A method for micro-location of RFID tags within a spatial environment, the method comprising steps of:

providing a plurality of radio frequency identification (RFID) tags within a three dimensional (3D) space;

moving a mobile platform, within the 3D space, wherein the mobile platform has a known location;

collecting, with a plurality of RFID antennas mounted on the mobile platform, backscatter signals of at least one of the RFID tags;

time-synchronizing the collected backscatter signals with the known location of the mobile platform in the 3D space at a time of collection; and performing algorithmic RFID tag localization using at least, the collected backscatter signals of the at least one RFID tag and the time-synchronized known location of the mobile platform, thereby determining a micro-location of the at least one RFID tag within the 3D space;

wherein the algorithmic RFID tag localization further comprises:

creating a history of phase and received signal strength indicator (RSSI) of the collected backscatter signals of the at least one RFID tag over a period of time;

evaluating possible RFID tag locations; simulating a received signal phase and RSSI; and matching the history of phase and RSSI of the collected backscatter signals to the simulated received signal phase and RSSI.

11. The method of claim 10, wherein moving the mobile platform within the 3D space further comprises at least one of: a wheeled movement, a handheld movement, a robotic movement, a drone movement, a track-based movement, and an aerial movement.

12. The method of claim 10, wherein the plurality of RFID antennas mounted on the mobile platform are mounted facing laterally relative to a direction of movement of the mobile platform.

13. The method of claim 10, wherein the algorithmic RFID tag localization further comprises utilizing a machine learning model to recognize patterns in the collected backscatter signals, wherein the micro-location of the at least one RFID tag within the 3D space is determined.

14. The method of claim 10, wherein the algorithmic RFID tag localization further comprises utilizing a machine learning model to determine the micro-location of the at least one RFID tag based on correlations between a relative position of the mobile platform and the collected backscatter signals of the at least one RFID tag and the time-synchronized known location of the mobile platform.

15. The method of claim 10, wherein the algorithmic RFID tag localization further comprises associating the collected backscatter signals of the at least one RFID tag with interrogation signals emitted, wherein the micro-location of the at least one RFID tag is determined triangulation based on a time between an emission and a collection of the interrogation signals.

16. The method of claim 10, wherein the algorithmic RFID tag localization further comprises analyzing a Doppler frequency shift as the mobile platform moves past the at least one RFID tag.

17. The method of claim 10, wherein the algorithmic RFID tag localization further comprises using two or more RFID tag localization techniques.

18. The method of claim 10, wherein the location of the mobile platform within the 3D space is known using: one or more ultra-wideband (UWB) devices; one or more Light Detection and Ranging (LIDAR) devices; and/or one or more 3D Simultaneous Localization and Mapping (SLAM) devices.

19. A system for tracking a micro-location of RFID tags within a spatial environment comprising:
at least one radio frequency identification (RFID) tag moving within a three-dimensional (3D) space;
a plurality of RFID antennas fixedly positioned within the 3D space, wherein backscatter signals of the at least one RFID tag is collected by at least one of the plurality of RFID antennas and time-synchronized with a known location of the at least one of the plurality of RFID antennas in the 3D space at a time of collection; and
a computerized processing device in communication with the plurality of RFID antennas, wherein the computerized processing device performs algorithmic RFID tag localization using at least the collected backscatter signals of the at least one RFID tag and the time-synchronized known location of the at least one of the plurality of RFID antennas to determine a micro-location of the at least one RFID tag within the 3D space;
wherein the algorithmic RFID tag localization further comprises:
creating a history of phase and received signal strength indicator (RSSI) of the collected backscatter signals of the at least one RFID tag over a period of time;
evaluating possible RFID tag locations; simulating a received signal phase and RSSI; and
matching the history of phase and RSSI of the collected backscatter signals to the simulated received signal phase and RSSI.

20. The system of claim 19, wherein one or more of the plurality of RFID antennas is fixedly positioned: on a door; proximate to a conveyor belt; on a stationary mechanical device; or on a structure of the 3D space.

21. The system of claim 19, wherein the plurality of RFID antennas are mounted facing laterally relative to a direction of movement of the at least one RFID tag.

22. The system of claim 19, wherein the algorithmic RFID tag localization further comprises utilizing a machine learning model to recognize patterns in the collected backscatter signals, wherein the micro-location of the at least one RFID tag within the 3D space is determined.

23. The system of claim 19, wherein the algorithmic RFID tag localization further comprises utilizing a machine learning model to determine the micro-location of the at least one RFID tag based on correlations between a relative position of the at least one of the plurality of RFID antennas and the collected backscatter signals of the at least one RFID tag and the time-synchronized known location.

24. The system of claim 19, wherein the algorithmic RFID tag localization further comprises associating the collected backscatter signals of the at least one RFID tag with interrogation signals emitted, wherein the micro-location of the at least one RFID tag is determined triangulation based on a time between an emission and a collection of the interrogation signals.

25. The system of claim 19, wherein the algorithmic RFID tag localization further comprises analyzing a Doppler frequency shift as the at least one RFID tag moves past the at least one of the plurality of RFID antennas.

26. The system of claim 19, wherein the algorithmic RFID tag localization further comprises using two or more RFID tag localization techniques.

* * * * *